US012697198B2

(12) United States Patent
Chen et al.

(10) Patent No.: US 12,697,198 B2
(45) Date of Patent: Aug. 4, 2026

(54) ORTHODONTIC FORCE MEASUREMENT SYSTEM FOR PERSONALIZED TREATMENTS

(71) Applicant: The Trustees of Indiana University, Bloomington, IN (US)

(72) Inventors: Jie Chen, Carmel, IN (US); Dongcai Wang, Indianapolis, IN (US)

(73) Assignee: The Trustees of Indiana University, Bloomington, IN (US)

( * ) Notice: Subject to any disclaimer, the term of this patent is extended or adjusted under 35 U.S.C. 154(b) by 541 days.

(21) Appl. No.: 18/000,577

(22) PCT Filed: Jun. 4, 2021

(86) PCT No.: PCT/US2021/035819
§ 371 (c)(1),
(2) Date: Dec. 2, 2022

(87) PCT Pub. No.: WO2021/247950
PCT Pub. Date: Dec. 9, 2021

(65) Prior Publication Data
US 2023/0210648 A1 Jul. 6, 2023

Related U.S. Application Data

(60) Provisional application No. 63/035,030, filed on Jun. 5, 2020.

(51) Int. Cl.
*A61C 19/04* (2006.01)
*A61C 7/00* (2006.01)

(52) U.S. Cl.
CPC .............. *A61C 19/04* (2013.01); *A61C 7/002* (2013.01)

(58) Field of Classification Search
CPC ................................ A61C 19/04; A61C 7/002
(Continued)

(56) References Cited

U.S. PATENT DOCUMENTS 3,349,489 A * 10/1967 Shackleford ........... A61C 19/05
433/32
3,900,953 A * 8/1975 Posen .................... A61C 19/04
433/2
(Continued)

FOREIGN PATENT DOCUMENTS

CN 105520787 A * 4/2016 ............. A61C 7/002
CN 109692054 A * 4/2019 ............. A61C 19/04
WO WO-2021247950 A1 * 12/2021 ............. A61C 19/04

OTHER PUBLICATIONS

International Preliminary Report on Patentability received for PCT Patent Application No. PCT/US2021/035819, mailed on Dec. 15, 2022, 9 pages.
(Continued)

*Primary Examiner* — Matthew M Nelson
(74) *Attorney, Agent, or Firm* — Faegre Drinker Biddle & Reath LLP

(57) ABSTRACT
An orthodontic force measurement system that enables duplication of the patient's dentition for the application of appliances in a simulated clinical condition. Six components of the load system on individual teeth can be measured. The device can take patient-specific information, such as shapes and locations of the teeth, and duplicate them on the device. Clinicians will be able to apply different appliances to the denture and measure the load system on specific teeth. By accurately quantifying force/moments on individual teeth, individualized, predictable patient-specific orthodontic treatments can be implemented.

21 Claims, 10 Drawing Sheets

(58) Field of Classification Search
USPC ........................................................... 433/25
See application file for complete search history.

(56) References Cited

U.S. PATENT DOCUMENTS

| | | | | |
|---|---|---|---|---|
| 3,943,913 A * | 3/1976 | Johnson | ................ | A61B 5/1111 |
| | | | | 433/32 |
| 4,083,114 A * | 4/1978 | Acevedo | ................ | A61C 11/08 |
| | | | | 433/56 |
| 5,100,316 A * | 3/1992 | Wildman | ................. | A61C 7/12 |
| | | | | 433/2 |
| 5,803,730 A * | 9/1998 | Khademazad | ........ | A61B 5/1111 |
| | | | | 356/614 |
| 6,120,287 A * | 9/2000 | Chen | ......................... | A61C 7/02 |
| | | | | 433/2 |
| 7,481,121 B1 * | 1/2009 | Cao | .......................... | A61C 7/00 |
| | | | | 73/862.044 |
| 7,543,511 B2 * | 6/2009 | Kimura | ................. | A61C 19/04 |
| | | | | 73/862.381 |
| 7,837,904 B2 * | 11/2010 | Hedge | ................ | A61C 13/0003 |
| | | | | 264/16 |
| D663,424 S * | 7/2012 | Gilbert | ......................... | D24/177 |
| D688,803 S * | 8/2013 | Gilbert | ......................... | D24/177 |
| 8,943,886 B2 * | 2/2015 | Park | ......................... | A61C 7/02 |
| | | | | 73/172 |
| 10,993,782 B1 * | 5/2021 | Raslambekov | ......... | G06T 19/00 |
| 11,259,897 B1 * | 3/2022 | Raslambekov | ........ | G16H 40/63 |
| 11,992,383 B2 * | 5/2024 | Cao | ......................... | A61C 7/20 |
| 12,251,289 B2 * | 3/2025 | Cao | ......................... | A61C 7/002 |
| 12,491,057 B2 * | 12/2025 | Raby | ..................... | A61C 19/04 |
| 2003/0059736 A1 * | 3/2003 | Lai | ........................ | A61C 9/0046 |
| | | | | 433/24 |
| 2009/0030348 A1 * | 1/2009 | Kimura | .................. | A61C 19/04 |
| | | | | 600/590 |
| 2018/0189434 A1 * | 7/2018 | Zhou | ........................ | G06F 30/23 |
| 2020/0060612 A1 * | 2/2020 | Shen | ......................... | A61F 2/32 |
| 2022/0361996 A1 * | 11/2022 | Raby | ..................... | A61C 19/04 |
| 2023/0210648 A1 * | 7/2023 | Chen | ...................... | A61C 7/002 |
| | | | | 433/25 |
| 2024/0374350 A1 * | 11/2024 | Savignano | ............... | A61C 7/08 |

OTHER PUBLICATIONS

International Search Report and Written Opinion received for PCT Patent Application No. PCT/US2021/035819, mailed on Sep. 24, 2021, 11 pages.

* cited by examiner

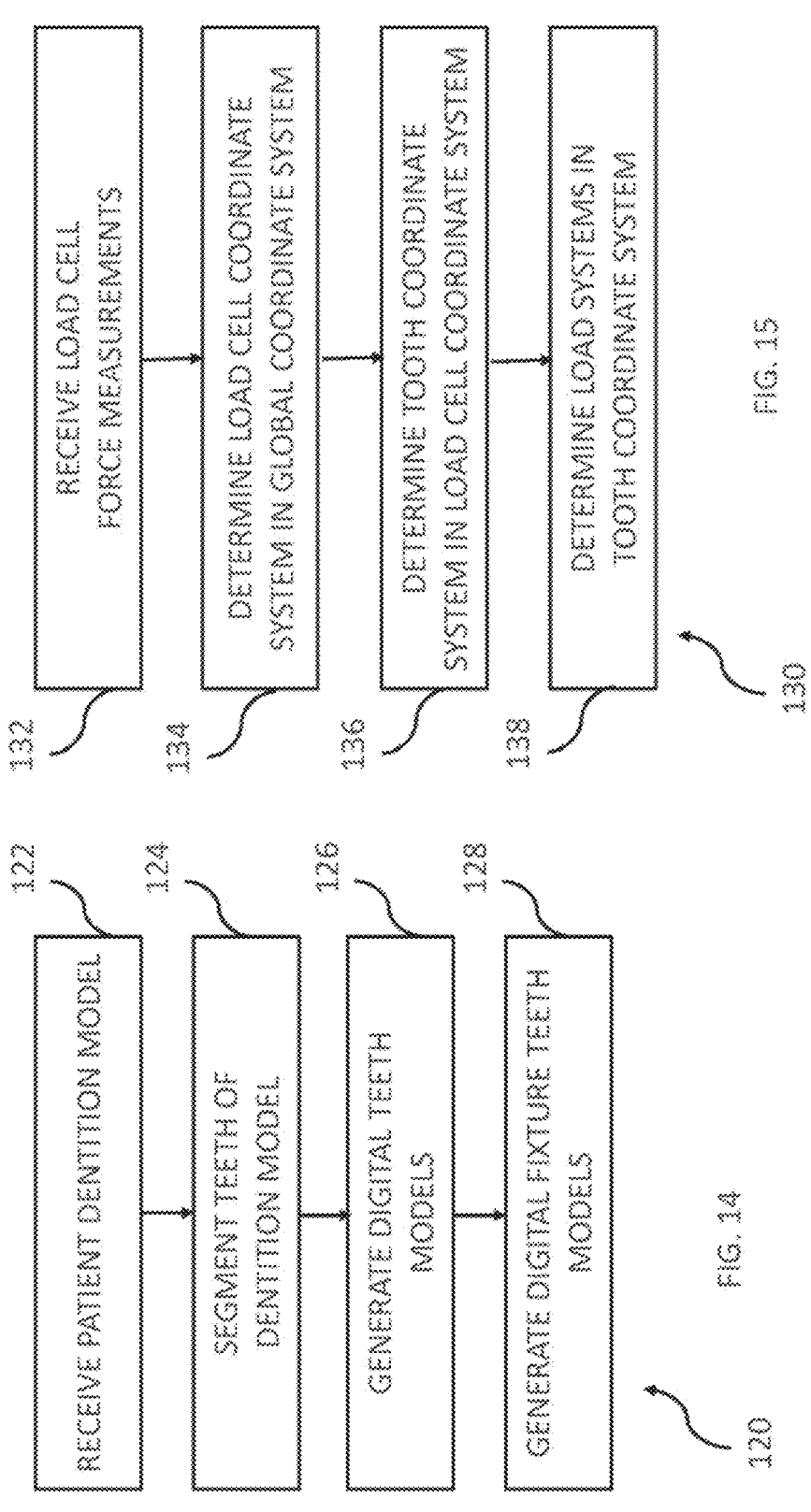

132 — RECEIVE LOAD CELL FORCE MEASUREMENTS

134 — DETERMINE LOAD CELL COORDINATE SYSTEM IN GLOBAL COORDINATE SYSTEM

136 — DETERMINE TOOTH COORDINATE SYSTEM IN LOAD CELL COORDINATE SYSTEM

138 — DETERMINE LOAD SYSTEMS IN TOOTH COORDINATE SYSTEM

122 — RECEIVE PATIENT DENTITION MODEL

124 — SEGMENT TEETH OF DENTITION MODEL

126 — GENERATE DIGITAL TEETH MODELS

128 — GENERATE DIGITAL FIXTURE TEETH MODELS

ORTHODONTIC FORCE MEASUREMENT SYSTEM FOR PERSONALIZED TREATMENTS

CROSS-REFERENCE TO RELATED APPLICATION

The present application claims priority to U.S. Provisional Patent Application No. 63/035,030, filed Jun. 5, 2020, titled "ORTHODONTIC FORCE MEASUREMENT SYSTEM FOR PERSONALIZED TREATMENTS", the entire disclosure of which is incorporated herein by reference.

FIELD

This disclosure relates generally to devices and methods for measuring load systems on dentition models of teeth of an orthodontic patient.

BACKGROUND

As part of orthodontic treatments, clinicians develop treatment plans that include moving certain teeth of patients, and keeping others stationary or minimally moved. Orthodontic appliances, such as bracket-wire systems and aligners, are commonly used to execute the treatment plans. Appliances are designed to provide a certain load system to each individual tooth to be moved. The load system is three-dimensional, and can be defined by three force components and three moment components. These force/moment components dictate the tooth movement patterns. Quantification of the load system on individual teeth enables verification of a treatment plan, which ensures effective treatment benefiting both clinicians and patients.

Orthodontic treatments commonly require moving specific teeth at different speeds, thus differential tooth movement is desired. For example, it may be desired to move certain teeth relatively fast, while other teeth serve as anchorage and are expected to have minimum movement. It is advantageous to quantify the load system so that it can be adjusted to meet the treatment needs of individual patients.

Quantifying the load system clinically may be challenging. Accurate quantification requires correct duplication of clinical conditions, meaning realistic geometry and correct interactions among the appliance, teeth, periodontal ligaments, and alveolar bone. Direct measurement of the load system in the clinic is not practical. Computational methods such as finite element analysis may provide only estimates because of necessary assumptions that simplify the interactions. Experimental validation of the analysis results would be advantageous, but is generally not available.

There remains, therefore, a need for improved devices and method for quantifying load systems on teeth clinically for ensuring implementation of the orthodontic treatment correctly. A system that is (1) capable of accurately measuring the clinical load system in-vitro, and (2) capable of implementing treatment strategies would be desirable. Such a system that can be efficiently used would also be advantageous.

SUMMARY

The present disclosure describes an orthodontic force measurement system that enables duplication of the patient's dentition for the application of appliances in a simulated clinical condition. Six components of the load system on individual teeth can be measured. The device can take patient-specific information, such as shapes and locations of the teeth, and duplicate them on the device. Clinicians will be able to apply different appliances to the denture and measure the load system on specific teeth. By accurately quantifying force/moments on individual teeth, individualized, predictable patient-specific orthodontic treatments can be implemented. The system enables two guidelines: the clinical teeth positions can be maintained, and the appliances can be installed following the same clinical procedures.

One example is a fixture system for measuring orthodontic load systems on selected tooth models of teeth of a patient's dentition. Embodiments of the fixture system may comprise: a frame; a plurality of load cells mounted to the frame; and one or more load cell tooth holders, wherein each load cell tooth holder is configured to support a load cell tooth model with respect to one of the one or more load cells at a position simulating a position of a corresponding tooth of the patient's dentition.

Another example is a fixture system for measuring orthodontic load systems on tooth models of teeth of a patient's dentition. Embodiments may comprise: a frame; a plurality of load cells mounted to the frame; one or more load cell tooth holders, wherein each load cell tooth holder is configured to support a load cell tooth model with respect to one of the one or more load cells at a position simulating a position of a corresponding tooth of the patient's dentition; and one or more fixed tooth holders, wherein each fixed tooth holder is configured to support a fixed tooth model with respect to the frame at a position simulating a position of a corresponding tooth of the patient's dentition. Load systems are not measured on tooth models on the fixed tooth holders.

In embodiments, each load cell tooth holder is configured to removably support the load cell tooth model with respect to the load cell. Each load cell tooth holder may include a mounting member extending from the load cell; and each load cell tooth model may include a tooth portion and an adapter portion coupled the tooth portion, wherein the adapter portion is configured to removably engage the mounting member. The load cell tooth holder is configured to be removably mounted to the load cell in embodiments.

Embodiments may include one or more load cell tooth models, each load cell tooth model engaged with a mounting member of a load cell tooth holder, and wherein the adapter portion is configured to position the tooth portion at the position of the corresponding tooth of the patient's dentition.

In embodiments, each fixed tooth holder is configured to removably support the fixed tooth model with respect to the frame. Each fixed tooth holder may include: a mounting member extending from the frame; and each fixed tooth model may include a tooth portion and an adapter portion coupled the tooth portion, wherein the adapter portion is configured to removably engage the mounting member. The fixed tooth holder is configured to be removably mounted to the frame. Embodiments may include one or more fixed tooth models, each fixed tooth model engaged with a fixed tooth holder, and wherein the adapter portion is configured to position the tooth portion at the position of the corresponding tooth of the patient's dentition.

In embodiments, the adapter of each fixed tooth model is configured to removably engage the mounting member of a load cell tooth holder; and the adapter of each load cell tooth model is configured to removably engage the mounting member of a fixed tooth holder.

Each fixed tooth holder is configured to removably support the fixed tooth model with respect to the frame in embodiments, Each fixed tooth holder may include: a mounting member extending from the support member; and each fixed tooth model may include a tooth portion and an adapter portion coupled the tooth portion, wherein the adapter portion is configured to removably engage the mounting member. The fixed tooth holder may be configured to be removably mounted to the frame.

In embodiments, the load cells are located on the frame in a generally U-shaped arrangement. The frame may include: a base, and wherein the load cells are mounted to the base; and a support, and wherein the support is spaced from the base, defines a generally U-shaped edge aligned with the U-shaped arrangement of the load cells, and is configured to receive the fixed tooth holders. In embodiments the load cells are three dimensional load cells.

Another example is a computing system for use in connection with the fixture system for measuring orthodontic load systems on tooth models of teeth of a patient's dentition. The computing system may comprise: memory to store: load cell position data defining positions of the plurality of load cells with respect to one another in a first coordinate system; tooth model data representative of the load cell tooth models supported by the load cell tooth holders and the fixed tooth models supported by the fixed tooth holders; and dentition position data defining positions of the load cell tooth models and the fixed tooth models with respect to one another in a second coordinate system; and a processing system configured to: receive load measurement data from each load cell supporting a load cell tooth model; and determine the load system data in the tooth coordinate system.

In embodiments, the processing system is configured to convert the load data on the load cell to force/moment data on the teeth by: determining the tooth coordinate system in the load cell coordinate system by coordinate transformation; and determining the force/moment data in the tooth coordinate system. The tooth model data may comprise three-dimensional model data defining surfaces of the load cell tooth models and the fixed tooth models to which treatment appliances can be applied. The treatment measurement data may comprises three-dimensional force/moment data.

Examples include a computer system for generating tooth models from dental records for use in connection with a fixture system for measuring orthodontic treatments on tooth models of teeth of a patient's dentition. The computer system may comprise: memory for storing data representative of relative locations of the load cells and/or tooth holders; one or more processors configured to: receive dentition data representative of a patient's dentition, wherein the dentition data includes shape data defining the three-dimensional shapes of the teeth and position data defining of the positions of the teeth with respect to one another; and create a digital tooth model for one or more teeth of the dentition, wherein the digital tooth model includes the tooth on an adapter, and wherein the adapter is configured to position a physical tooth fixture model of the tooth at the position of a corresponding tooth of the patient's dentition when mounted to the tooth holder.

Examples also include constructing a physical fixture tooth model including the adapter, optionally by 3D printing, based on the digital tooth model.

BRIEF DESCRIPTION OF THE DRAWINGS

FIG. 14 diagrammatic illustration of a method for generating fixture tooth models in accordance with embodiments.

FIG. 15 is a diagrammatic illustration of a method for determining modeled dentition load systems in accordance with embodiments.

DETAILED DESCRIPTION

Figure 1:
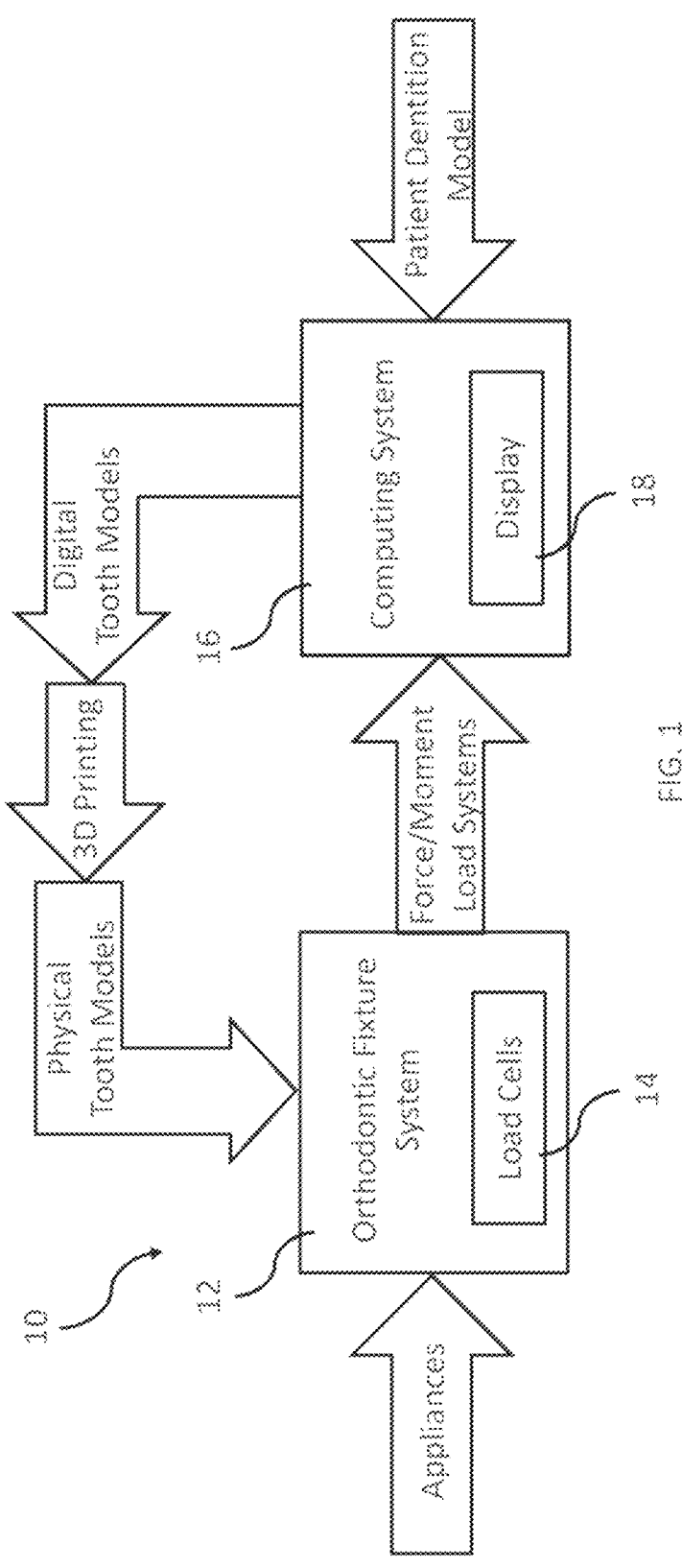
FIG. 1 is a diagrammatic illustration of an orthodontic force measurement system in accordance with embodiments.
Figure 3:
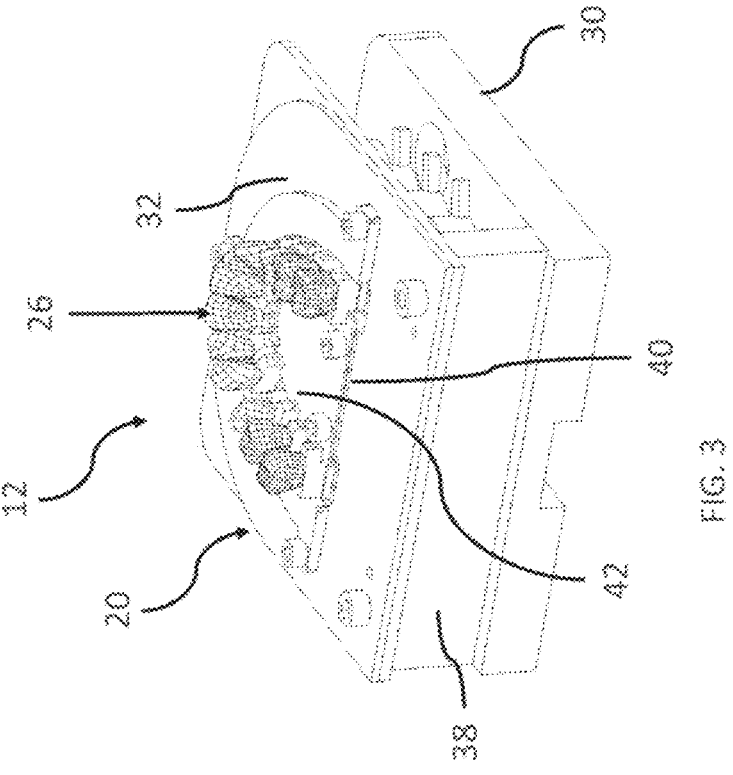
FIG. 3 is an isometric illustration of a fixture system with tooth models positioned thereon in accordance with embodiments.

FIG. 1 is a diagrammatic illustration of an orthodontic force measurement system 10 in accordance with embodiments. System 10 includes a fixture assembly or system 12 comprising a plurality of load cells 14, and a computing system 16 comprising a display 18. Briefly, and as described in greater detail below, system 10 can be used by clinicians to implement patient-specific orthodontic treatments for individual patients.

Computing system 16 is configured to receive a digital dentition model of the patient. The dentition model (such as a dental cast, impression, etc.) or three-dimensional images (such as CT scans) may be a solid model, and includes information representative of the three-dimensional (3D) shapes of the teeth (e.g., including data defining the outer surfaces of the teeth) subject to treatment, and information representative of the positions of the teeth with respect to one another (e.g., the locations and orientations of the teeth). Based on the dentition model, computing system 16 generates digital tooth models representative of physical, fixture tooth models of the individual teeth. The fixture tooth models are configured for use with the fixture system 12. In embodiments, the fixture tooth models are configured in such a manner that when the fixture tooth models are positioned on the fixture system 12, the tooth models will simulate the shapes and positions of the corresponding teeth in the patient's dentition. The fixture physical tooth models are than constructed based on the digital tooth models, such as for example by 3D printing.

The physical fixture tooth models are positioned on the fixture system 12. The fixture tooth models on the fixture system 12 provide a simulated dentition model representing the patient's actual dentition (e.g., the fixture tooth models will have the shapes and positions of the corresponding teeth in the patient). Using this dentition model, the clinician can apply selected or newly designed appliances to the physical tooth models on the fixture system 12. Nonlimiting examples of such appliances include braces (e.g., brackets and archwires), aligners and segmental springs. Once the appliances are activated as being used in the clinic, the load cells 14 measure the forces applied to the tooth models by the appliances. The measured load system is sent to computing system 16. Computing system converts the load system measured by the load cells 14 in the coordinate system of the load cells to the load system acting on the individual fixture tooth models (e.g., in the coordinate system of the dentition/fixture models). The load system conversion can be done by transformation using the relative positions of the fixture tooth models and the load cells 14. The load systems on the fixture tooth models can then be displayed or otherwise provided to the clinician, such as by the display 18.

Using the force measurement system 10, clinicians can confirm whether the appliance to be used can implement the treatment plan, which includes moving certain teeth or groups of teeth, and keeping other teeth stationary. Clinicians and other users such as appliance manufacturers and researchers can experimentally measure the force/moment on individual teeth of the patient in-vitro. An instrumented dental model specific to the patient is provided, enabling the users to adjust the appliances to desired values so the desired treatment plan can be accurately determined and executed. Advantages include more predicable treatment outcomes, and may significantly shorten the treatment time.

FIGS. 2-11 illustrate a fixture system 12 in accordance with embodiments. As shown, the fixture system 12 includes a frame 20, a plurality of load cells 14, a plurality of load cell tooth holders 22, and a plurality of fixed tooth holders 24. Each of the load cell tooth holders 22 and the fixed tooth holders 24 is configured to releasably receive and hold or support a fixture tooth model 26. The illustrated embodiment of frame 20 includes a base 30 and a support 32. Load cells 14 are mounted to the base 30 and positioned in a generally U-shaped arrangement corresponding to locations of teeth about upper and lower jaws of a patient (maxilla or mandible). The illustrated embodiment includes fourteen load cells 14, each of which corresponds to one of the fourteen teeth that may be found in the patient. Support 32 is a plate-shaped member in the illustrated embodiment, and includes an edge 34 defining a generally U-shaped opening 36. Support 32 and frame 20 can be one piece or separate pieces for ease of fabrication. Support 32 is mounted in a spaced-apart relationship with respect to the base 30 (e.g., above the base in the illustrated embodiment), with the U-shaped opening 36 generally aligned with the U-shaped arrangement of the load cells 14. A spacer block 38 supports the support 32 with respect to the base 30 in the illustrated embodiments. A U-shaped plate 37 (FIG. 2) can be used to hold the fixture tooth models 26 in place.

Frame 20 also includes a shim 40 and locating slice 42 in the illustrated embodiments. Shim 40 and locating slice 42 (which in embodiments can be one piece) are mounted to the support 32 and extend into the U-shaped opening 36 of the support 32. As described in greater detail below, the shim 40 and locating slice 42 can be used to align heights of the fixture tooth models 26 on the frame 20. Once the tooth models 26 are aligned and fixed by the plate 37, the shim 40 and locating slice 42 may be removed.

Load cells 14 provide information representative of load systems applied to them. In embodiments, load cells 14 are three-dimensional devices capable of providing information representative of the forces and moments applied to the load cells in three dimensions (e.g., about x, y and z axes). Using this measured load information, computing system 16 is capable of computing the three-dimensional force/moment components acting on each fixture tooth model 26 mounted to the fixture system 12 (e.g., the forces and moments about each of the x, y and z axes). Three-dimensional load cells of these types are commercially available from suppliers such as ATI Automation. Other embodiments include other load cell structures, such as for example strain gauges, to measure forces.

Figure 4:
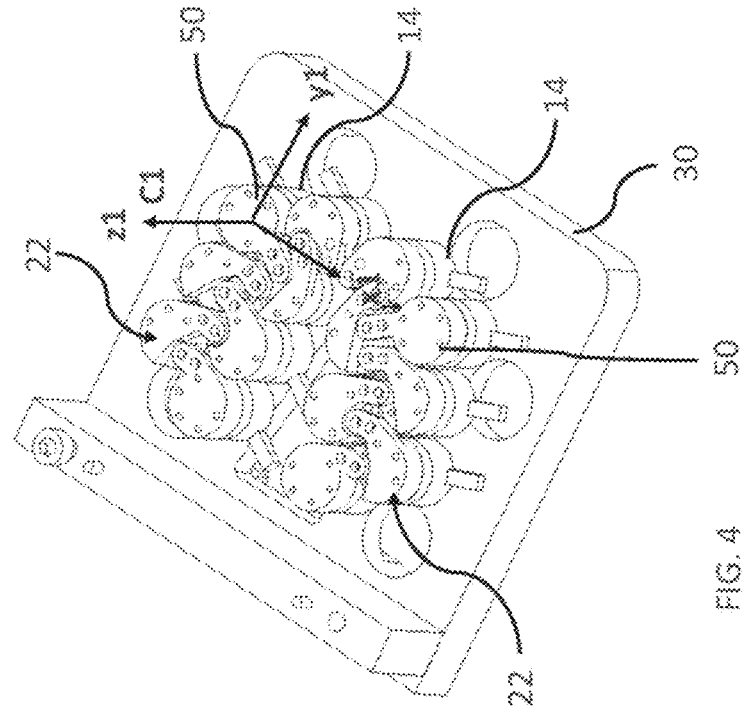
FIG. 4 is an isometric illustration of a base of the fixture system, showing load cells and load cell tooth mounts, in accordance with embodiments.
Figures 5, 6, 7:
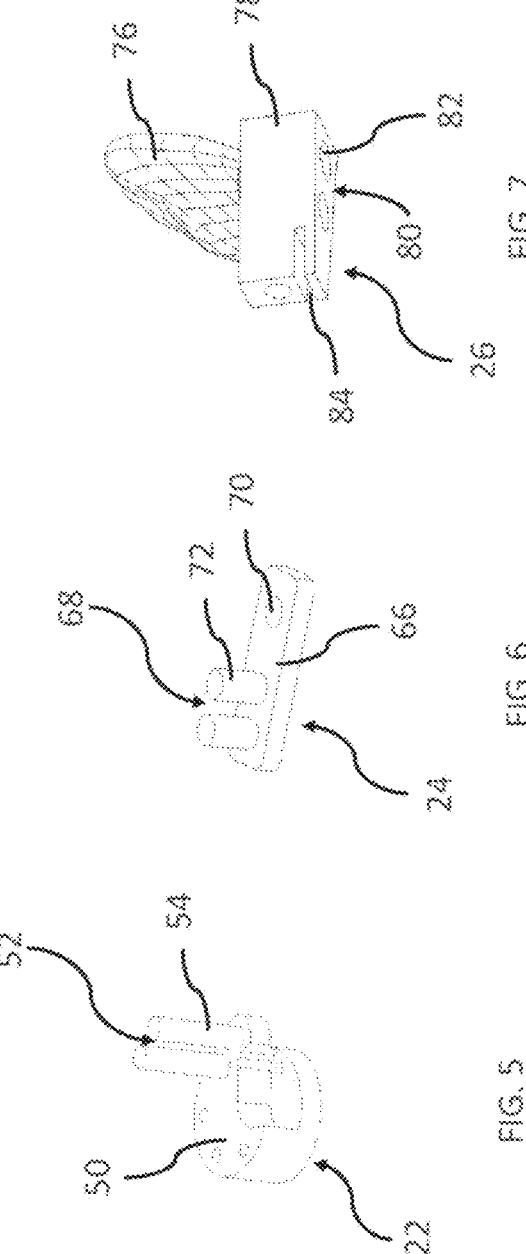
FIG. 5 is an isometric illustration of a load cell tooth mount in accordance with embodiments.
FIG. 6 is an isometric illustration of a fixed tooth mount in accordance with embodiments.
FIG. 7 is an isometric illustration of a fixture tooth model in accordance with embodiments.

As perhaps best shown in FIGS. 4 and 5, each load cell tooth holder 22 includes a base 50 and a mount 52. The base 50 is configured to releasably engage an associated load cell 14. Mount 52 is configured to releasably receive and support an associated fixture tooth model 26. In the illustrated embodiments, the mount 52 includes a pair of posts 54 configured to securely mate and engage with the fixture tooth model 26. Other embodiments include different structures providing the functionality of mount 52 (e.g., clips or other mating and interlocking structures).

Figure 9:
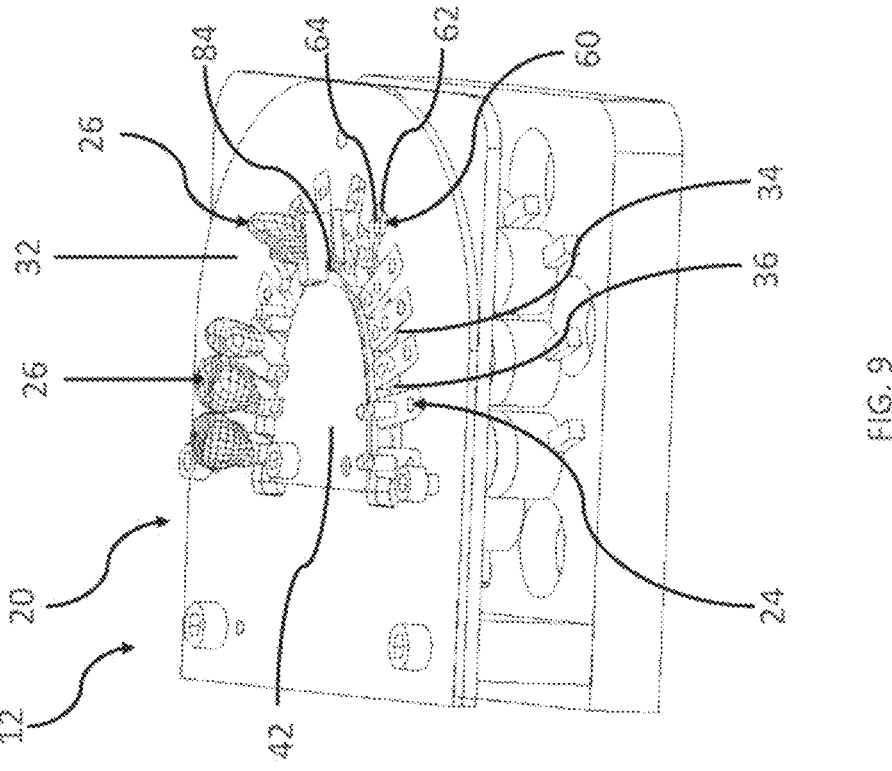
FIG. 9 is an isometric illustration of the fixture system showing a fixed tooth mount and a fixture tooth model positioned on the fixed tooth mount, in accordance with embodiments.
Figure 8:
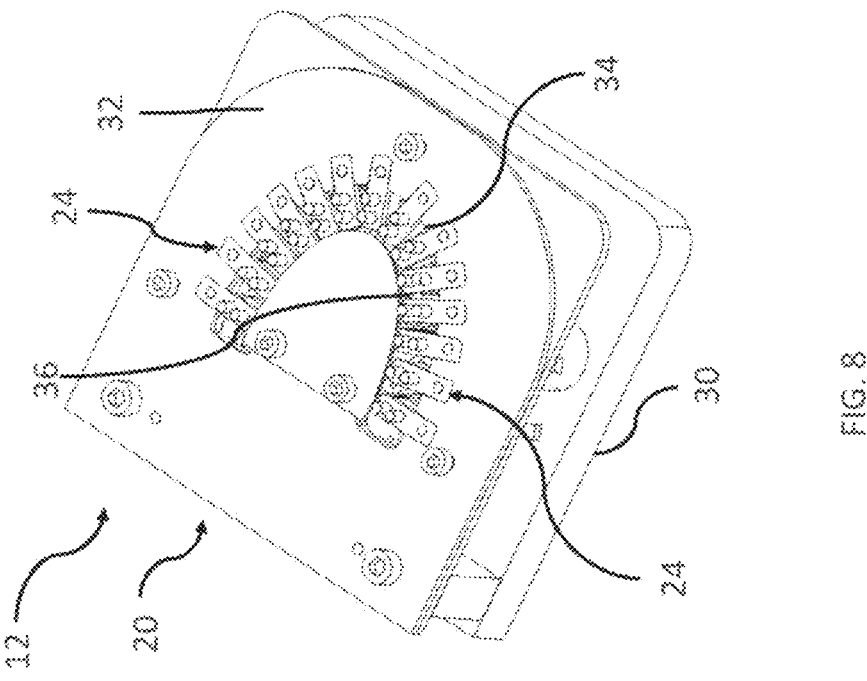
FIG. 8 is an isometric illustration of the fixture system including fixed tooth mounts in accordance with embodiments.
Figure 11:
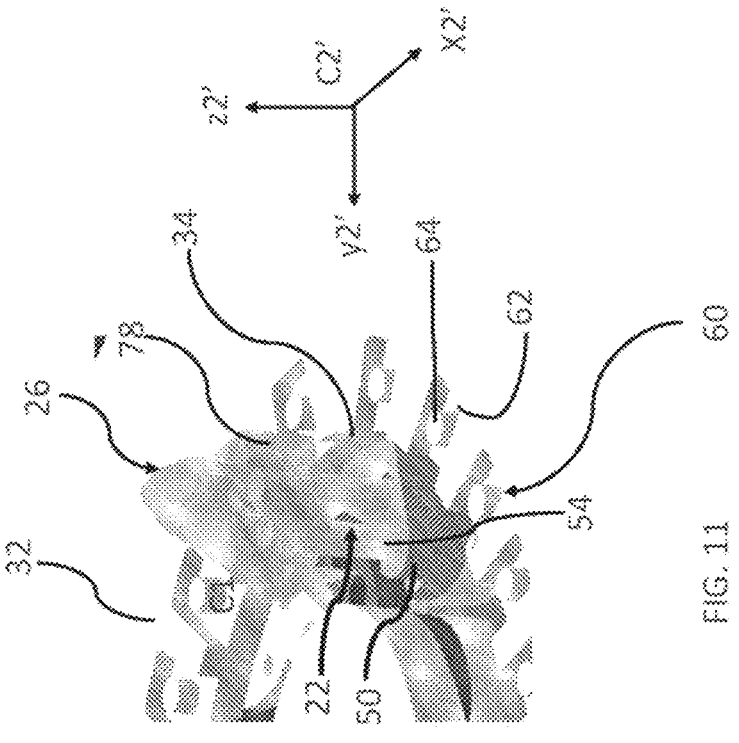
FIG. 11 is a detailed isometric illustration of the fixture system showing a load cell tooth mount and a fixture tooth model positioned on the load cell tooth mount, in accordance with embodiments.
Figure 10:
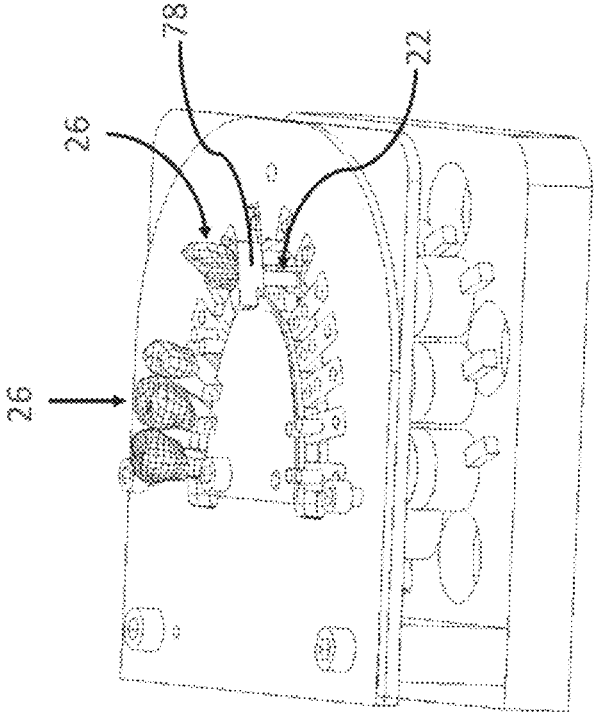
FIG. 10 is an isometric illustration of the fixture system showing a load cell tooth mount and a fixture tooth model positioned on the load cell tooth mount, in accordance with embodiments.

As shown for example in FIGS. 9, 10 and 11, support 30 includes a plurality of fixed tooth mounts 60 located about the U-shaped edge 34 of the support. Similar to the arrangement of the load cells 14, the fixed tooth mounts 60 are positioned in a generally U-shaped arrangement corresponding to locations of teeth about upper and lower jaws of a patient. The illustrated embodiment includes fourteen fixed tooth mounts 60, each of which corresponds to one of the fourteen teeth that may be found in the patient. Each of the fixed tooth mounts 60 is configured to releasably receive and support a fixed tooth holder 24. The illustrated embodiments of fixed tooth mounts 60 include a locating groove 62 in the support 30 and a pin 64 extending from the support in the groove. Other embodiments include different configurations of fixed tooth mounts 60 that mate with corresponding structures of fixed tooth holders 24.

FIG. 6 illustrates an embodiment of a fixed tooth holder 24 configured to releasably mate and engage with the illustrated embodiments of fixed tooth mounts 60. Each fixed tooth holder 24 includes a base 66 and a mount 68. Base 66 is shaped to securely mate and engage with the locating grooves 62 in the support 30, and includes an aperture 70 configured to mate and engage with the pins 64 in the locating grooves 62. Each fixed tooth holder 24 is configured also to releasably receive and support tooth models 26. In the illustrated embodiments, the mount 68 includes a pair of posts 72 configured to securely mate and engage with the fixture tooth model 26. In the illustrated embodiment, the mounts 68 on the fixed tooth holders 24 are substantially the same as or similar to the mounts 52 on the load cell tooth holders 22, so that the fixture teeth models 26 can positioned on either a fixed tooth holder (e.g., if no load system is wanted) or a load cell tooth holder (e.g., if a load system is to be measured).

FIG. 7 illustrates a fixture tooth model 26. As shown, each fixture tooth model 26 includes a tooth portion 76 and an extension or adapter 78. Tooth portion 76 extends from the adapter 78, and is a physical model of the associated tooth of the patient. The tooth portion 76 typically includes the crown portion of the tooth. Adapter 78 includes a mount 80 configured to releasably mate and engage with the mounts 52 of the load cell tooth holders 22 and the mounts 68 of the fixed tooth holders 24. In the illustrated embodiments, the mounts 80 of the adapters 78 include two apertures 82 that are configured to securely receive the posts 54 of the load cell tooth holders 22 and the posts 72 of the fixed tooth holders 24. FIGS. 10 and 11, for example, illustrate tooth models 26 mounted to load cell tooth holders 22. FIG. 9, for example, illustrates a fixture tooth model 26 mounted to a fixed tooth holder 24, where the fixed tooth holder is mounted to a fixed tooth mount 60. Other embodiments of adapters 26 include other structures configured to releasably yet securely mate and engage with the mounts 52 of load cell tooth holders 22 and the mounts 68 of fixed tooth holders 24. Fixture tooth models 26 that are positioned on load cell tooth holders 22 may be referred to in this document as load cell tooth models, and fixture tooth models that are positioned on fixed tooth holders 24 may be referred to as fixed tooth models. The illustrated embodiments of adapters 26 also include a locating groove 84. As shown for example in FIG. 9, the locating groove 84 is configured to releasably receive and mate with the locating slice 42. Using shims 40, the height of the fixture tooth models 26 on the frame 20, can be aligned.

As described in greater detail below, each adapter 78 of a fixture tooth model 26 is constructed in conjunction with the associated tooth portion 76 so that when the fixture tooth model is positioned on the frame 20 (e.g., on a load cell tooth holder 22 or a fixed tooth holder 24), the tooth portion is positioned and registered at a position that corresponds to the position of the associated tooth in the patient's dentition. The interface between the fixture tooth models 26 and the frame 20 provides sufficient strength to releasably lock the fixture tooth models in their clinical positions. In these embodiments, fixture system 12 including the base 30, load cells 14, load cell tooth holders 22, support 32 and fixed tooth holders 24 are common or universal components that can be used to model the dentition of a plurality of individual patients. The adapters 78 are patient-specific components in these embodiments, and cause the tooth portions 76 of the fixture tooth models 26 to be positioned and registered at relative positions corresponding to the actual teeth of the patient's dentition when the tooth models are positioned on the fixture system 12. These components are configured to enable the fixture tooth models 26 to connect to load cells 14 without interfering with neighboring fixture tooth models. In other embodiments, other components of the fixture system, such as for example the load cell tooth holders or the fixed tooth holders, are constructed based on information representative of the patient's dentition to cause the tooth portions 76 to be registered and positioned at positions corresponding to the associated positions of the patent's teeth in the patient's dentition.

The illustrated embodiments of adapters 26 also include a locating groove 84. As shown for example in FIG. 9, the locating groove 84 is configured to releasably receive and mate with the locating slice 42. Using shims 40, the height or spacing of the fixture tooth models 26 on the frame 20, can be aligned. The x-y coordinates of the fixture tooth models 26 can be controlled by the mounts 68 on the fixed tooth holders 24 and the mounts 52 on the load cell tooth holders 22, and the heights of the fixture tooth models can be controlled by the interaction between the shim 40/locating slice 42 and the locating groove 84 on the adapter 26.

Figure 12:
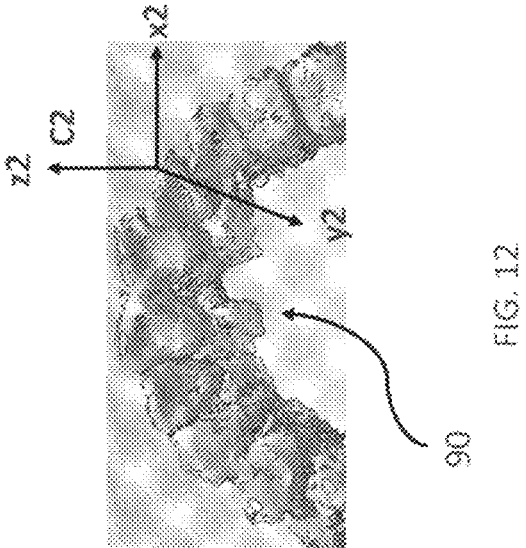
FIG. 12 is a graphical representation of a digital model of a patient's dentition.

Embodiments of system 10 (FIG. 1) use information representative of several different reference frames or coordinate systems of the components of the fixture system 12 in connection with the computation or determination of the dentition force/moment systems modeled on the fixture system. A dental record has its own coordinate system, C, which comes from CT scans or a 3D digitizer used to convert clinical dental records into digital forms. Each load cell 14 has its own coordinate system used to define the measured load system. The system 12 has a coordinate system, C1, which is used to define the locations of the load cells 14. Each tooth model 26 has its own coordinate system which can be defined by the user depending on the clinical needs. For example, and as shown in FIG. 4, the positions of the load cells 14 can be defined with respect to one another in a first, global or frame coordinate system C1. In the illustrated embodiment, coordinate system C1 defines the positions of the load cells 14 with respect to one another about orthogonal axes x1, y1 and z1. C3 is the coordinate system of the load cell 14 where the measured load system is expressed. FIG. 12 illustrates a graphical representation of an exemplary digital dentition model 90 of a patient. The positions of the teeth of the dentition model 90 can be defined with respect to one another in C1. Each tooth has its second, local or dentition coordinate system C2 based on the users' preference. For example, C2 can be located at the center of a bracket or center of the crown. In the illustrated embodiment, coordinate system C2 defines the components of load system on the teeth of the dentition model 90 in the directions of orthogonal axes x2, y2 and z2. The relationship between C1 and C3 is known and fixed. The relationship between C and C2 is also fixed, but are expressed in two coordinate systems. C is in the dental record coordinate system and C2 is in the device coordinate system, C1, which is patient specific. Other embodiments use other coordinate systems, such as for example spherical coordinate systems.

Figure 13:
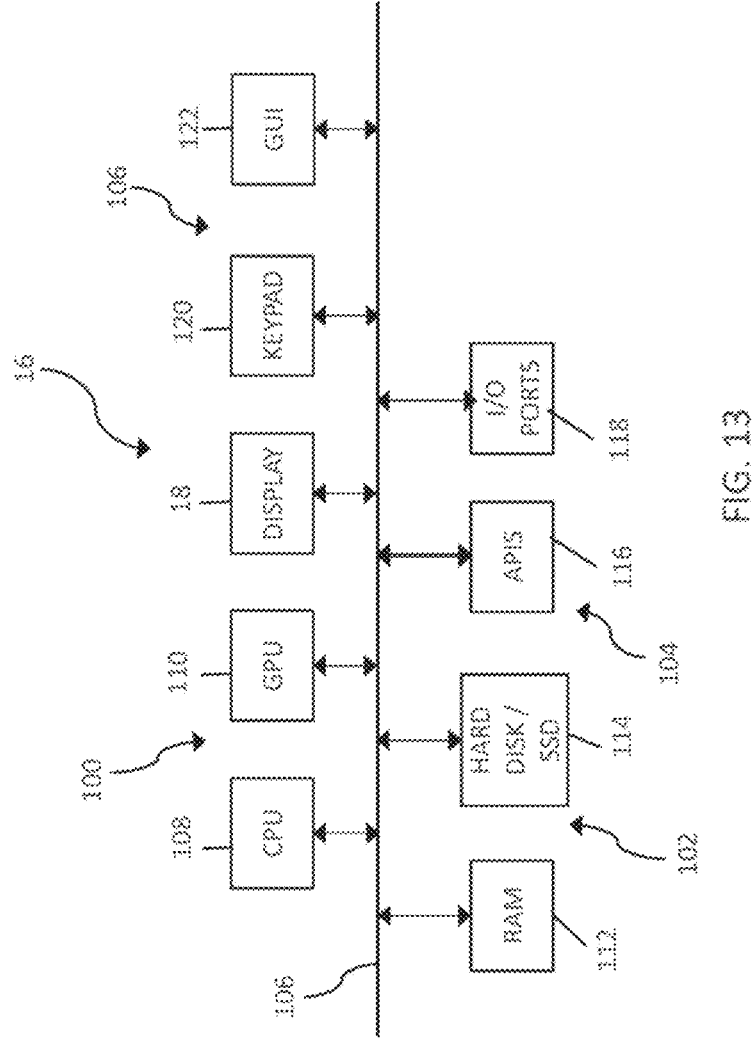
FIG. 13 is a diagrammatic illustration of components of a computing system in accordance with embodiments.

FIG. 13 is a diagrammatic illustration of an exemplary computing system 16. The illustrated embodiments of computing system 16 comprise processing components 100, storage components 102, network interface components 104 and user interface components 104 coupled by a system network or bus 106. Processing components 100 may, for example, include central processing unit (CPU) 108 and graphics processing unit (GPU) 110, and provide the processing functionality of the computing system 16. The storage components 102 may include RAM memory 112 and hard disk/SSD memory 114, and provide the storage functionality of the computing system 16. For example, operating system software used by the processing components 100 and one or more application or other third party software packages used by the computing system 16 to implement methods described herein may be stored by the storage components 102. By way of example, software executed to determine the tooth force/moment systems based on the information received from the load cells 14, and three-dimensional modeling software used to determine the digital tooth models, may be stored by the storage components 102. In embodiments, the network interface components 104 include one or more application programming interfaces (APIs) 116 and/or input/output ports 118 to implement interfaces between the computing system 16 and other systems such as the fixture system 12 (e.g., the load cells 14) and other resources such as 3D printers, dentition model sources and imaging systems used in connection with the computing system 16 and/or fixture system 12. Examples of user interface components 106 include display 18, keypad 120 and graphical user interface (GUI) 122. Embodiments of computing system 30 may include other conventional or otherwise known components to provide computing and networking functionality in accordance with embodiments described herein.

FIG. 14 is a diagrammatic illustration of a method 120 by which computing system 16 can be operated to generate digital tooth models that can be used to construct the fixture tooth models 26. In embodiments, computing system 16 may make use of conventional or otherwise known 3D modeling software. As shown by step 122, computing system 16 receives the digital dentition model 90 of the patient. Dentition models of the these types can be obtained by conventional or otherwise known approaches, such as by electronic imaging of the patient's teeth, or by imaging casts or impressions of the teeth. For example, the patient's upper and lower jaws can be digitally reconstructed using image processing software such as MIMICS, available from Materialize of Lueven, Belgium. The models may include all the teeth of the patent's upper and/or lower arch, or fewer teeth from one or both of the arches that are subject to treatment. The received model 90 will typically include information representative of the all of the patient's teeth that will be involved in the treatment to be planned using the fixture system 12. The position information of the teeth will be converted from C to C1 through coordinate transformation. In embodiments, the received dentition model 90 will define the modeled structures in the dentition coordinate system C1. Then C2 for individual teeth will be established manually by the user, which will also be expressed in C1. Eventually, C2 will be expressed in C3 so that the load system expressed in C3 can be transformed to C2

As shown by step 124, computing system 16 processes the dentition model 90 to segment each tooth (e.g., the crown) of the dentition model that will be involved in the treatment. The segmentation step 124 is performed by the 3D modeling software in embodiments. A digital model of the segmented tooth is generated as shown by step 126. In embodiments, the components of the load system on each digital tooth model expressed in C2 will be calculated by step 124. The generated digital tooth models also include information representative of the position (i.e., location and orientation) of the associated tooth with respect to one or more other teeth in the dentition model 90. In embodiments, the positions of the segmented tooth models are defined in the device coordinate system C1.

As shown by step 128, using the digital tooth models, computing system 16 generates digital fixture models of the physical fixture tooth models 26. The digital fixture tooth models include information characterizing the shape of the tooth portion 76 and the adapter 78. In connection with the embodiments described herein, the digital fixture tooth model defines the adapter 78 a manner that causes the tooth portion 76 of the corresponding physical fixture tooth model 26 to be positioned at a position corresponding to the position of the associated tooth in the dentition model 90 when the physical fixture tooth model is assembled onto the frame 20 (e.g., onto one of the load cell tooth holders 22 or the fixed tooth holders 24).

The physical fixture tooth models 26 are made or otherwise constructed based on the digital fixture tooth models defined by method 120. Known or otherwise conventional manufacturing processes can be used to construct the fixture tooth models 26. In embodiments, for example, the fixture tooth models 26 can be 3D printed using conventional 3D printing technologies using the digital fixture tooth models. In other embodiments the fixture tooth models 26 are molded.

Computing system 16 is illustrated and described herein as a functional component. Although the digital tooth model generation method 120 is described in connection with the computing system 16 that performs other computing functionalities in connection with the system 10 such as generating the force/moment systems provided by the fixture system 12, it is to be understood that the digital tooth model generation method can be performed by other physical computing systems. In embodiments, for example, third parties different than the clinicians using the fixture system 12 to plan treatments may perform the digital tooth model generation method 120 as a service at locations remote from the fixture system 12, and provide the digital tooth models to the clinician or other person or entity constructing the fixture tooth models 26. Similarly, third parties different than the clinicians using the fixture system 12 may construct the physical fixture tooth models 26, and provide the fixture tooth models to the clinicians.

Figure 2:
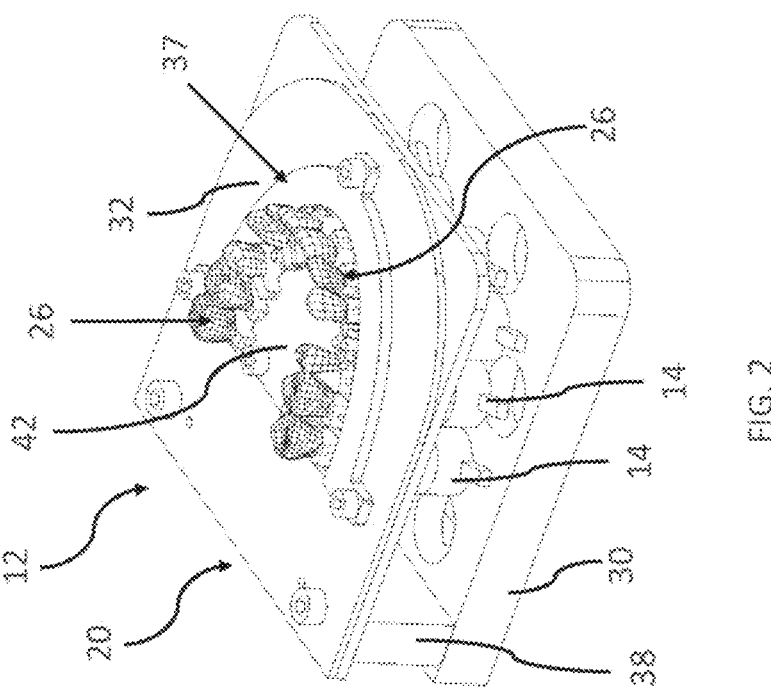
FIG. 2 is an isometric illustration of a fixture system with tooth models positioned thereon in accordance with embodiments.

After receiving the fixture tooth models 26 of the patient, the clinician/technician will position the fixture tooth models on the fixture system 12 at positions corresponding to the associated positions of the teeth in the patient's dentition. Shim 40 will be inserted to align the teeth and the teeth will be fixed to the device by the plate 37 (FIG. 2). When the fixture tooth models 26 are so positioned on the fixture system 12, the positions of the fixture tooth models will correspond to the positions of the associated teeth in the patient's dentition. The dentition of the fixture tooth models 26 on the fixture system 12 thereby defines a patient-specific model simulating the patent's actual dentition. Depending on the nature of the treatment being planned, the one or more of the fixture tooth models 26 will be positioned on load cell tooth holders 22. One or more of the fixture tooth models 26 may also be positioned on the fixed tooth holders 24. For example, the clinician may place fixture tooth models 26 on fixed tooth holders 22 if the load system on the corresponding tooth in the patient's dentition is not of interest during the treatment.

Using the fixture system 12 assembled with the fixture tooth models 26, the clinician/technician/researcher can evaluate and design appliances that will deliver the load systems desired for the specific orthodontic treatments for the patient. For example, the clinician may apply different designs of the appliances to the fixture tooth models 26 (e.g., to the surfaces of the tooth portions 76) to evaluate whether the desired load system can be delivered. The modeled treatments with the appliances mounted to the fixture tooth models 26 may accurately simulate treatments that can be applied to the patient's dentition.

After preparing a modeled treatment, the clinician/researcher can apply the appliance, activate it, and measure the load system on the tooth through the fixture system 12 and computing system 16. The load cells 14 can then simultaneously measure the loads applied to the fixture tooth models 26 by the modeled treatment. The measured loads (i.e., simulated treatment measurement data) from the load cells 14 are received by the computing system 16.

FIG. 15 is a diagrammatic illustration of a method 130 by which the computing system 16 can determine the load systems on the fixture tooth models 26 from the measured loads from the load cells 14. Because the modeled patent's dentition defined by the fixture tooth models 26 is spaced from locations from the load cells 14, the origins of the load cell coordinate system C3 and the dentition model coordinate system C2 do not have a common origin, and the load systems measured by the load cells 14 differ from the load systems on the fixture tooth models 26. To accommodate for these differences, the computing system 16 converts the measured load systems from the load cells 14 into the corresponding load systems in the dentition coordinate system C2, using the relative positions of the load cells and fixture tooth models 26. In the embodiments, computing system 16 stores load cell position data representative of the positions of the load cells 14 in the global or frame coordinate system C1. Computing system 16 receives and stores the dentition model data representative of the positions of the patient's teeth in the global or frame coordinate system C1. The stored dentition model data defines the positions of the load cell fixture tooth models 26 and fixed fixture tooth models 26 on the fixture system 12. Computing system 16 receives and stores the tooth model data representative of the shapes of the patient's teeth in the global or frame coordinate system C1. As discussed above, the stored tooth model data defines the shapes of the crown portions of the load cell fixture tooth models 26 and the fixed fixture tooth models 26.

In the embodiment of method 130 described with reference to FIG. 15, the computing system 16 receives the load measurements expressed in the load cell coordinate system C3 from the load cells 14 as shown by step 132. As shown by step 134, the computing system 16 establishes or determines the load cell coordinate system C3 in the global or frame coordinate system C1. Then, the tooth coordinate system C2' can be established with the origin at the point the load system on the tooth is defined and orientations that are treatment dependent. The tooth coordinate system C2' is then expressed or determined in the load cell coordinate system C3 as shown by step 136. In embodiments, computing system 16 performs steps 134 and 136 using coordinate transformation through a transformation matrix mathematically. Any suitable known or otherwise conventional coordinate transformation can be used in connection with steps 134 and 136. In embodiments, for example, computing system 16 uses transformation processes such as those described in the Chen et al. article "The Three-Dimensional Kinematics and Flexibility Characteristics of the Human Ankle and Subtalar Joint-Part II: Flexibility Characteristics," Journal of Biomechanical Engineering, Vol, 110, pp. 374-385, November 1988. By this step 136 the relative position or the tooth coordinate system C2' in the load cell coordinate system C3 is determined. Using the location of the load cells 14 and associated fixture tooth models 26 in the tooth coordinate system C2', the load system measurement from each load cell 14 can be converted to the tooth coordinate system, which will be the load system on the associated fixture tooth model 26.

Figure 16:
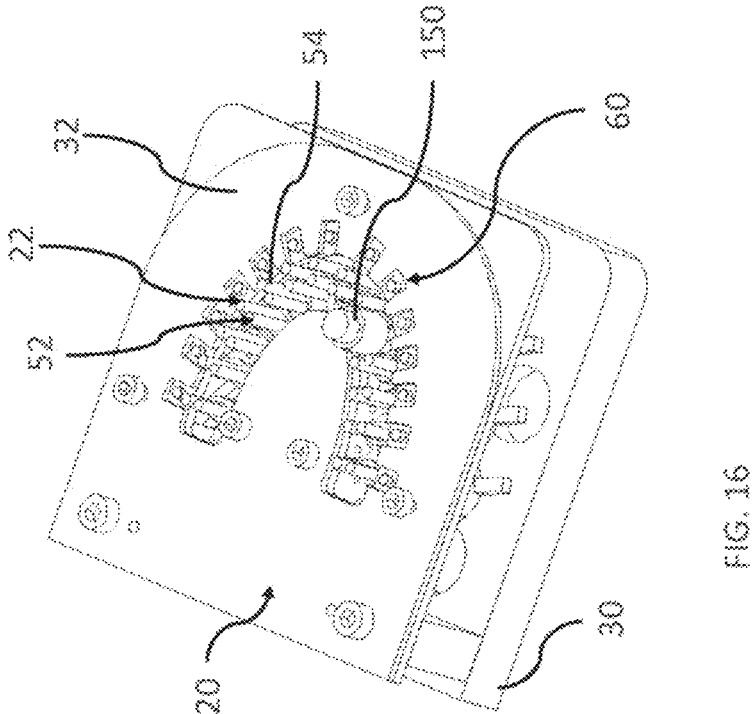
FIG. 16 is an isometric illustration of the fixture system with a calibration device positioned on a load cell tooth mount, in accordance with embodiments.

Each fixture tooth model 26 will have its own load transformation, which may depends on accurate input of the point on which the force will be measured. As shown in FIG. 16 a calibration device 150 can be configured to allow placing a known force to a known location on each load cell 14 in the load cell coordinate system. Applying the force in this manner should result in known readings by the load cells 14. Any mismatch indicates errors of the location input, and can be notified to an operator by the computing system 16.

In the detailed description above, reference is made to certain accompanying drawings which form a part hereof, and in which is shown by way of illustration specific embodiments in which the present disclosure is practiced. These embodiments are described in sufficient detail to enable those skilled in the art to practice the present disclosure, and it is to be understood that other embodiments can be utilized and that structural changes can be made without departing from the scope of the present disclosure. Therefore, the detailed description is not to be taken in a limiting sense, and the scope of the present disclosure is defined by the appended claims and their equivalents.

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments. Furthermore, the described features, structures, or characteristics of the subject matter described herein may be combined in any suitable manner in one or more embodiments.

The invention claimed is:

1. A fixture system for measuring orthodontic load systems on tooth models of teeth of a patient's dentition, comprising:

a frame;

a plurality of load cells mounted to the frame;

a plurality of fixture tooth models, each of the plurality of fixture tooth models including a tooth portion and an adapter portion;

one or more load cell tooth holders, wherein each load cell tooth holder is configured to support a fixture tooth model of the plurality of fixture tooth models with respect to one of the plurality of load cells at a position simulating a position of a corresponding tooth of the patient's dentition; and one or more fixed tooth holders, wherein each fixed tooth holder, when mounted to the frame, is held in a fixed position relative to the frame and is configured to support a fixture tooth model of the plurality of fixture tooth models with respect to the frame at a position simulating a position of a corresponding tooth of the patient's dentition;

wherein the adapter portion of each fixture tooth model is coupled to and constructed in conjunction with the tooth portion of the fixture tooth model, the adapter portion being patient-specific such that when the fixture tooth model is supported by a corresponding load cell tooth holder, the adapter portion causes the tooth portion to be positioned at a position corresponding to an actual tooth of the patient's dentition.

2. The fixture system of claim 1 wherein each load cell tooth holder is configured to removably support the fixture tooth model with respect to the one of the plurality of load cells.

3. The fixture system of claim 2 wherein each fixed tooth holder is configured to removably support the fixture tooth model with respect to the frame.

4. The fixture system of claim 3 wherein each fixed tooth holder includes:

a base configured to mount to the frame and a mount extending from the base; and wherein the adapter portion of each fixture tooth model is configured to removably engage a corresponding mount.

5. The fixture system of claim 4 wherein the fixed tooth holder is configured to be removably mounted to the frame.

6. The fixture system of claim 1 wherein:

each load cell tooth holder includes a mount extending from the load cell tooth holder; and the adapter portion of each fixture tooth model is configured to removably engage a corresponding mount.

7. The fixture system of claim 6 wherein the load cell tooth holder is configured to be removably mounted to the load cell.

8. The fixture system of claim 1 wherein each fixed tooth holder is configured to removably support the fixture tooth model with respect to the frame.

9. The fixture system of claim 8 wherein each fixed tooth holder includes:

a base configured to mount to the frame and a mount extending from the base;

wherein the adapter portion of each fixture tooth model is configured to removably engage a corresponding mount.

10. The fixture system of claim 9 wherein the fixed tooth holder is configured to be removably mounted to the frame.

11. The fixture system of claim 1 wherein the plurality of load cells is located on the frame in a generally U-shaped arrangement.

12. The fixture system of claim 11 wherein the frame includes:

a base, and wherein the plurality of load cells is mounted to the base; and a support, and wherein the support is spaced from the base, defines a generally U-shaped edge aligned with a U-shaped arrangement of the plurality of load cells, and is configured to receive the one or more fixed tooth holders.

13. The fixture system of claim 1 wherein each of the plurality of load cells is a three-dimensional load cell.

14. The fixture system of claim 1, wherein the adapter portion of each fixture tooth model includes a locating groove and the frame includes a locating slice, the locating groove being configured to releasably receive and mate with the locating slice.

15. The fixture system of claim 14, wherein the frame further includes a shim, the shim being configured to cooperate with the locating slice and the locating groove to adjust a position of the fixture tooth model.

16. A computing system for use in connection with the fixture system for measuring orthodontic load systems on tooth models of teeth of a patient's dentition of claim 1, comprising:

memory that stores:

load cell position data defining positions of the plurality of load cells with respect to one another in a first coordinate system;

tooth model data representative of the fixture tooth models supported by the one or more load cell tooth holders and the one or more fixed tooth holders; and dentition position data defining positions of the fixture tooth models with respect to one another in a second coordinate system; and a processing system configured to:

receive load measurement data from each of the plurality of load cells supporting a fixture tooth model; and determine load system data in the second coordinate system.

17. The computing system of claim 16 wherein the processing system is configured to convert the load system data on the load cell to force/moment data on the teeth by:

determining the second coordinate system in the first coordinate system by coordinate transformation; and determining the force/moment data in the second coordinate system.

18. The computing system of claim 16 wherein the tooth model data comprises three-dimensional model data defining surfaces of the fixture tooth models to which treatment appliances can be applied.

19. The computing system of claim 16 wherein the load system data comprises three-dimensional force data.

20. A computer system for generating tooth models for use in connection with the fixture system for measuring orthodontic treatments on tooth models of teeth of a patient's dentition of claim 1, comprising:

memory for storing data representative of relative locations of the plurality of load cells, the one or more load cell tooth holders, and/or the one or more fixed tooth holders;

one or more processors configured to:

receive dentition data representative of a patient's dentition, wherein the dentition data includes shape data defining three-dimensional shapes of the teeth and position data defining of positions of the teeth with respect to one another; and create a digital tooth model for one or more teeth of the dentition, wherein the digital tooth model includes the tooth on an adapter, and wherein the adapter is configured to position the tooth portion of the fixture tooth model at the position of a corresponding tooth of the patient's dentition when mounted to the one or more load cell tooth holders, and/or the one or more fixed tooth holders.

21. The computer system of claim 20, wherein the one or more processors are further configured to:

construct the fixture tooth model including the adapter based on the digital tooth model.

* * * * *